United States Patent [19]
Griffioen

[11] Patent Number: 5,971,035
[45] Date of Patent: Oct. 26, 1999

[54] METHOD FOR INSTALLING A DUCTING SYSTEM WITH BRANCHES FOR TELECOMMUNICATIONS CABLES, AND BRANCH ELEMENT FOR USE IN THAT METHOD

[75] Inventor: William Griffioen, Ter Ar, Netherlands

[73] Assignee: Koninklijke KPN N.V., Groningen, Netherlands

[21] Appl. No.: 08/768,312

[22] Filed: Dec. 17, 1996

[30] Foreign Application Priority Data

Dec. 21, 1995 [NL] Netherlands ................. 1001961

[51] Int. Cl.⁶ ..................................... F16L 9/22
[52] U.S. Cl. ................. 138/155; 138/114; 138/109; 285/15; 285/132.1
[58] Field of Search ................. 138/155, 92, 157, 138/103, 111, 114, 109, 120, 177, 178; 285/15, 125.1, 132.1, 145.1, 131.1

[56] References Cited

U.S. PATENT DOCUMENTS

| | | | |
|---|---|---|---|
| 2,031,849 | 2/1936 | O'Leary | 285/132.1 X |
| 4,367,769 | 1/1983 | Bain | 138/114 |
| 5,394,502 | 2/1995 | Caron | 385/134 |

FOREIGN PATENT DOCUMENTS

| | | |
|---|---|---|
| A-0108590 | 5/1984 | European Pat. Off. . |
| A-3140928 | 5/1983 | Germany . |
| A-2267183 | 11/1993 | United Kingdom . |
| 2292018 | 2/1996 | United Kingdom . |

OTHER PUBLICATIONS

"Subducts: The Answer to Honolulu's Growing Pains" by Herman S.L. Hu and Ronald T. Miyahira in Telephony, Apr. 7, 1980, pp. 32–35.

*Primary Examiner*—Patrick Brinson
*Attorney, Agent, or Firm*—Frishauf, Holtz, Goodman, Langer & Chick, P.C.

[57] ABSTRACT

A method for installing a ducting system with branches, wherein at the point of a branch in an existing duct of the system a tubular branch element with an inlet opening, an outlet opening and at least one branch opening is arranged by removing a duct portion from the existing duct at the point of the branch, by sliding the branch element on one of the free ends of the existing duct resulting from the interruption, re-placing the removed duct portion or a portion identical in shape in the interruption and moving and securing the branch element in such a manner that the inlet opening and the outlet opening engage in sealing manner over the respective ends of the existing duct. In the duct with branches, over the entire length thereof, a bundle of subducts can be arranged, which subducts can then be branched off in a simple manner at the location of a branch. In a duct thus branched-off, for instance a continuous fiber optic cable can be installed.

16 Claims, 3 Drawing Sheets

METHOD FOR INSTALLING A DUCTING SYSTEM WITH BRANCHES FOR TELECOMMUNICATIONS CABLES, AND BRANCH ELEMENT FOR USE IN THAT METHOD

BACKGROUND OF THE INVENTION

This invention relates to a method for installing a ducting system with branches, wherein at a point where a branch is desired, a tubular branch element with an inlet opening, an outlet opening and at least one branch opening is arranged between two opposite free ends of a continuous duct of the system, with the distance between the opposite free ends of the duct being less than the distance between the inlet and the outlet opening of the branch element.

Such a method is known from GB-A-2,267,183.

Currently, the part of telecommunications networks that extends from exchanges, for instance exchanges for telephony or for community antenna installations, to the houses or buildings of users, still consists largely of copper cable. The networks mutually connecting the exchanges by contrast already largely consist of fiber optic cable. The network consisting of copper cable has a telescopic structure, with the cables consisting of a very large number of twisted pairs, and with welded joints between a main cable and a branch cable, the main cable having a greater number of twisted pairs than does a branch cable. In the future, it will be desired to install fiber optic cable instead of copper cable in the lines to the users as well, in view of the greatly superior properties of fiber optic cable as compared with copper cable. When using fiber optic cables, however, it is not desirable to have a large number of joints in view of the high costs per joint and the relatively substantial damping caused by a joint in proportion to the total signal damping of a fiber optic cable.

The article "Subducts: The answer to Honolulu's growing pains" by Herman S. L. Hu and Ronald T. Miyahira in Telephony, Apr. 7, 1980, pages 23–35, describes a proposal to accommodate fiber optic cables in a separate guide tube or subduct, with four guide tubes installed in a primary duct forming part of a primary duct network. By using the guide tubes, it is possible, as the need for telecommunications connections increases, to provide a fiber optic cable in more of the guide tubes, without this fiber optic cable being hampered during installation by cables already present. At branches, a joint is made in the fiber optic cable.

Further, EP-A-0,108,590 describes a ducting network, the ducts of which have priorly been provided with a number of separate channels, allowing a separate fiber optic cable to be installed in each channel without armour or water barrier. The duct provided with channels protects the fiber optic cables against external influences, such as moisture and the like. In this way, as it were, a network with individual cables to each house is created, with the cables being arranged in parallel channels up to the branches. The existing ducts with preformed channels, even if they are provided with a water barrier, are not suitable to be buried directly in the ground. A mechanical protection is necessary. In the art, for that purpose, use is made of an existing infrastructure of concrete pipes of large dimensions. At every point where a duct with channels is coupled to another duct with channels, this necessitates the use of relatively costly junction boxes. In such a junction box each of the continuous channels is connected with the corresponding channel of a next duct by means of a coupling element and any channels to be branched off are likewise connected with channels in a branch duct by means of coupling elements. In the channels coupled in such a manner, the fiber optic cables can be installed without a joint from the main duct to the branch duct.

OBJECT OF THE INVENTION

The object of the invention is to provide a method which enables the use a primary duct system having therein a number of guide tubes for fiber optic cables, which system has a lowest possible cost price and which makes it possible to use, instead of the costly junction boxes, simple branch couplings for the branch ducts of the primary duct system, while also making it possible to branch off the fiber optic cables in the guide tubes without a joint.

A primary duct system with a low cost price means first of all that the material costs of the ducts and the costs for installing them should be as low as possible, to which end it is desired to use ducts that have an internal dimension that is only little greater than the external dimension of the bundle of guide tubes to be installed but sufficiently great to provide the desired mechanical protection.

In Dutch patent application 1001960, filed simultaneously, a method is described wherein a bundle of guide tubes or subducts are installed in an existing duct by means a fluid under pressure, for instance compressed air. Such a method has major advantages over the conventional techniques, where cables or tubes are installed in existing ducts by means of a pull cord. However, such a blowing technique can be applied with success only if the entire bundle of guide tubes are blown into the existing duct simultaneously, because in the case of a duct filled only partly with guide tubes, when blowing an additional tube into the existing duct, it may be a problem to achieve the maximum installation length. Blowing one or more guide tubes simultaneously into the existing duct starting from every branch in a direction towards the beginning/end of that duct is costly and unpractical. Accordingly, it is necessary to blow the bundle of tubes from the beginning of the existing duct. However, this leads to the problem that it is practically impossible to blow the guide tubes directly into a desired branch, so that the entire bundle of tubes must be blown from the beginning to the end of the existing duct.

SUMMARY OF THE INVENTION

The invention provides a solution which makes it possible to make branches beforehand in an existing duct which is to be filled from the beginning to the end, for instance by means of a blowing technique, with a bundle of guide tubes, one or more of which it must be possible to branch off at a branch. The invention is characterized in that the branch element, of which the inlet opening and outlet opening and at least a part of the passage between them have a greater dimension in cross section than the dimension of the continuous duct, is slid onto one of the free ends of the continuous duct, in that an element having substantially the same dimensions as to internal diameter and length as the interruption between the free ends of the continuous duct is placed between the free ends in a form divisible in the longitudinal direction of the duct, and in that the branch element is moved and secured in such a manner that the inlet opening engages in sealing manner over one end of the continuous duct adjacent the interruption and the outlet opening engages in sealing manner over the other end of the continuous duct adjacent the interruption.

Through the method according to the invention, at any desired point in the main duct, prior to the installation of the bundle of guide tubes, a branching point can be realized, whereby, due to the restoration of the continuous inside wall of the existing duct at the interruption by re-placing the removed duct potion or a replacement element therefor, a continuous conduit for installing a bundle of guide tubes is maintained.

Although the method according to the invention is particularly suitable for use in combination with a blowing technique for installing the bundle of guide tubes, such a bundle can also be installed in a conventional manner, for instance by means of pulling with a pull cord. If use is made of a blowing technique, according to one embodiment, the seals between the existing duct and, respectively, the inlet opening and the outlet opening, are made of substantially airtight design and the branch opening is also closed substantially airtightly.

Once the bundle of guide tubes has been installed, a branch can be realized by shifting the branch element on the existing duct again, removing the re-placed duct portion and interrupting the guide tube or tubes for the branch and coupling to the interruption a further guide tube, using a coupling element known per se, which provides an airtight connection. The coupled guide tube can then be passed via the branch opening to a branch duct. Then the branch element can be positioned again and via the branched guide tube a fiber optic, a copper cable or any other suitable type of transmission line, can be brought by an existing technique via the main duct and the branch duct to a house or building where a subscriber terminal is located.

The invention also provides a branch element for use in the method according to the invention, characterized by an inlet opening, an outlet opening and at least one branch opening, with the inlet opening and the outlet opening comprising means for connecting them in sealing engagement with the external circumference of a duct, while the interior space of the branch element between the inlet and outlet opening is suitable for receiving an insert element consisting of two dish-shaped portions, then together defining an interior space closed in longitudinal direction, with a predetermined cross-sectional area.

The above-mentioned GB-A-2,267,183 describes a Y-shaped branch element for a ducting system through which cables can be directed without using guide tubes for the individual cables. The branch element is fixedly included in a ducting system to be installed, while the branch opening remains permanently accessible from the duct for the purpose of guiding a cable therethrough. This would make it considerably more difficult to initially introduce a bundle of tubes over the entire duct length, which, for that matter, is not mentioned at all in this publication.

Further, DE-A-3,140,928 describes a method of arranging in an existing (water) pipe a Y-shaped branch for a telecommunication cable to be routed through the duct. To that end, the pipe is interrupted in situ and the Y-shaped branch element is secured by means of flanges to flanges which are arranged on the free ends of the pipe on opposite sides of the interruption. However, no mention is made of a branch element that can be moved over the continuous duct to clear the interruption again for the purpose of afterwards making a branch in a bundle of tubes at that point. The branch end of the Y-shaped element is provided with means for sealing the cable passage in a moisture-proof fashion.

It is further observed that U.S. Pat. No. 5,394,502 discloses a Y- or T-piece which is intended to be clamped onto a bundle of cables in order that one of the cables can be branched off more easily without buckling. However, no duct system is involved here.

BRIEF DESCRIPTION OF THE DRAWINGS

The invention will be further explained hereinafter on the basis of an exemplary embodiment with reference to the drawings, in which.

DETAILED DESCRIPTION

According to the invention, a "trunk" of a primary ducting network consisting of ducts 1 (also referred to as 'tubes' in the description of the drawings) is laid in an excavated trench or in a different, existing conduit, for instance a very large concrete pipe. The "branches" of the branch network consist of branch tubes 2. Depending on the planning of the digging work, etc, the tubes 1 and 2 can be laid simultaneously or at different points of time. Optionally, upon closure of the free ends of the tubes 1 and 2 of the ducting network with, for instance, plugs, the trench can presently be closed again.

Figure 1:
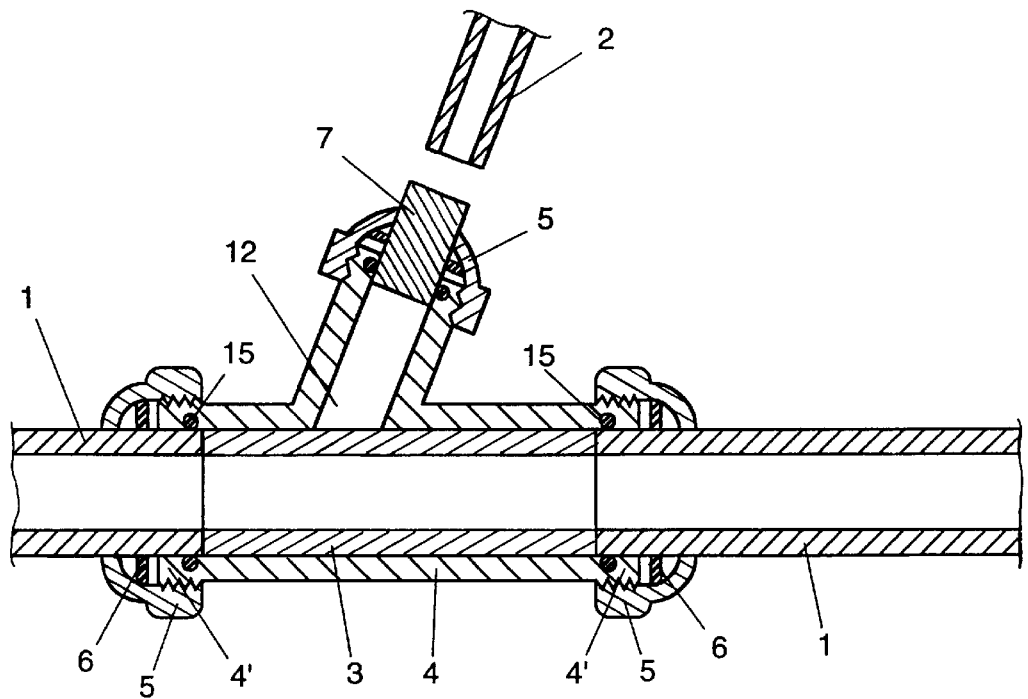
FIG. 1 shows a first embodiment of a branch element according to the invention.
Figure 2:
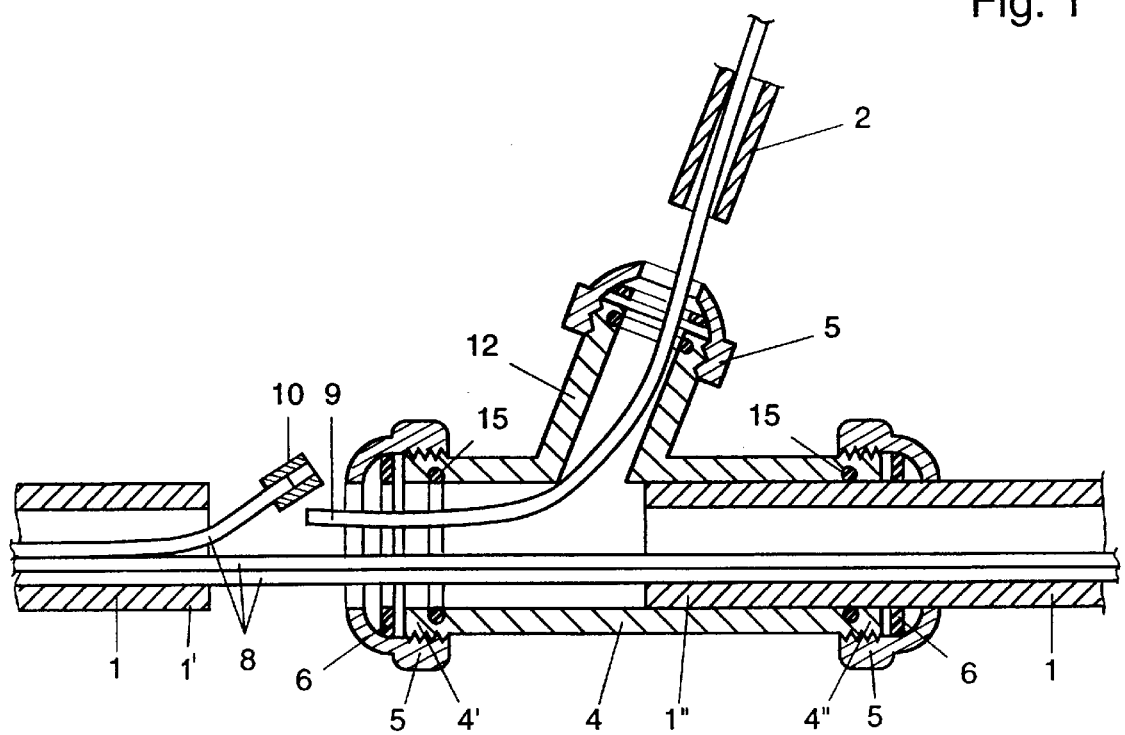
FIG. 2 shows the manner in which a branch can be realized with the aid of the branch element according to FIG. 1.

Simultaneously with the installation of the ducting network or at the moment when the ducting network is going to be put into use, the tube 1 is cleared again at the point where branch tubes 2 are coated and a portion of a predetermined length is removed from the tube 1, as shown in FIG. 2. A branch element 4, which has a Y-shape according to FIG. 1 but may also have, for instance, a T-shape or even several branch openings 12, is fitted by an inlet opening 4' thereof over the exposed end 1' of the tube 1. Obviously, the internal diameter of the branch element 4 is so chosen as to enable this. The branch element 4 is moved up so far as to be entirely disposed over the tube end 1'. Then a filler piece 3 consisting of two complementary "dishes" is arranged in the free opening between the ends 1' and 1" of the tube 1, which filler piece 3 ensures that the inside wall of the tube 1 regains its original shape as far as possible, without unnecessary protrusions, sharp edges, and the like. Optionally, for this purpose the removed tube portion can be used after it has been divided in two lengthwise. According to the exemplary embodiment of FIGS. 1 and 2, the filler piece 3 has an external diameter corresponding with the external diameter of the tube 1. The branch element 4 is then slid back until the outlet opening 4" is disposed over the other free end 1" of the tube 1. By means of union nuts 5, in which rubber clamping rings 6 have been fitted, the inlet opening 4' and the outlet opening 4" are connected in sealing engagement with the circumference of the tube 1. For the purpose of further improving the seal, rubber O-rings 15 can be fitted on the inner circumference of the inlet opening 4' and the outlet opening 4". By means of a plug 7, the branch opening 12 of the branch element can, if desired, be sealed as well. The branch opening 4' too can be provided with a union nut 5. In this way, a tube 1 with a branching possibility is obtained, while the inside surface of the tube 1 remains continuous and free from protrusions or the like. In addition, the branch element is fitted over the tube 1 in sealing engagement therewith. If it is desired to install a bundle of guide tubes by means of a blowing technique, the seals referred to must be substantially airtight.

After all branching points have been realized using branch elements 4, a bundle of guide tubes 8 is installed in the tube 1 using some known technique or other. For the sake of clarity, FIG. 2 shows a tube 1 with only three tubes 8. After this bundle of tubes has been routed through the entire tube 1, the actual branches can be made. To that end, the union nuts 5 are loosened and the branch element is moved aside again over the tube 1, so that the portion 3 can be removed. Then one or a few of the guide tubes which are to be branched off, are cut through and the free end is connected by means of a coupling sleeve 10, known per se for this purpose, to the end of a branch guide tube 9, which has been led into the tube 1 via the branch duct 2 and the branch opening 12. The coupling sleeve, a special embodiment of which is described in British patent application 9420349.4, provides for the airtight connection between the cut guide tube 8 and the guide tube 9, so that afterwards a fiber optic cable can be blown into it, which then continues from the guide tube in the tube 1 to the guiding tube 9 in the branch tube 2 without a joint in the fiber optic cable. After making the connection between the two guide tubes, the branch element can be arranged again and be secured on tube 1.

The bundle of guide tubes installed in the existing duct can optionally be provided with a common envelope which may optionally comprise a water barrier. When making a branch in the bundle, it is then necessary adjacent the branch first to remove the envelope locally in order to enable interruption of the guide tube to be branched off.

If the distance from the branch to the actual terminal of a fiber optic or copper cable to be installed is slight, it is also possible to omit the guide tube 9 and merely to ensure that the cut end of the guide tube 8 projects sufficiently far into the branch opening to make sure that the cable to be installed can pass the transition from tube 1 to tube 2. The residual blowing force is then typically sufficient to move the cable over the residual distance without this cable being surrounded by a guide tube. Optionally, it is possible by means of a coupling 10 to couple to the free end of the guide tube 8 an additional length of guide tube which projects into the tube 2, to prevent the free end of the tube 8 from leaving the branch opening 12 of the branch element 4 in any manner, which might occur, for instance, during digging work.

Figure 3A:
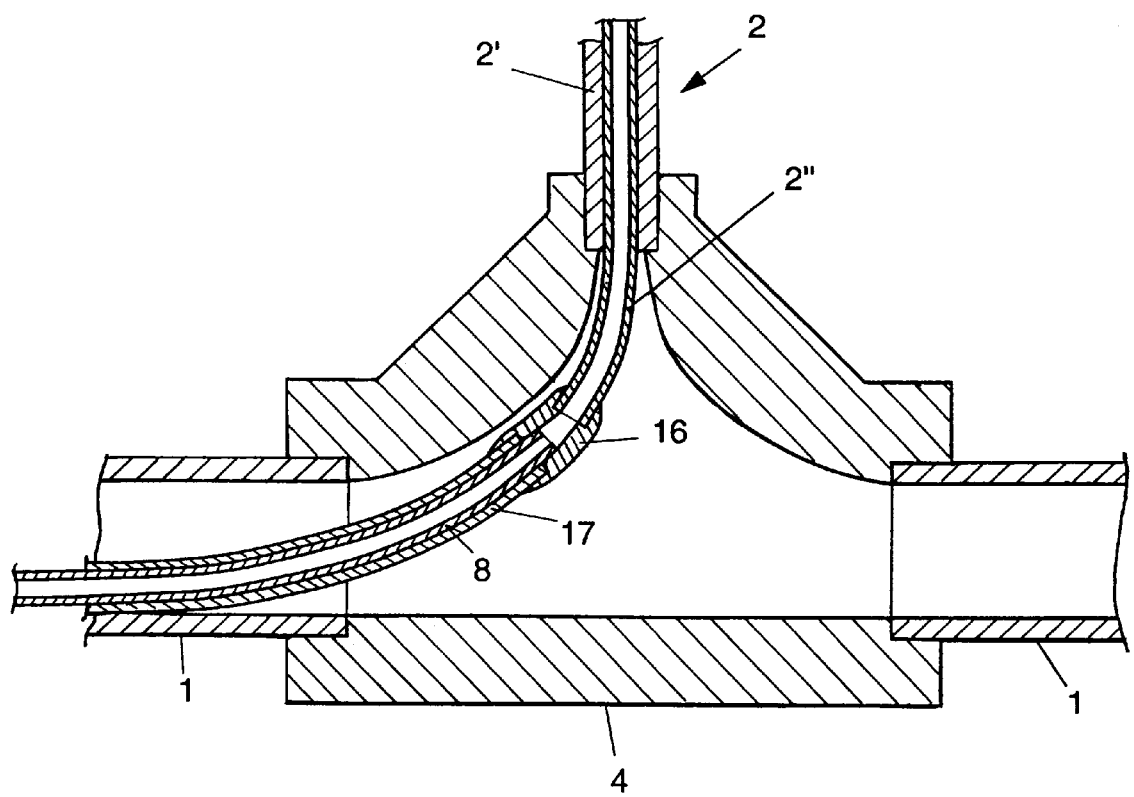
FIGS. 3a,b show a different way in which a branch can be realized.
Figure 3B:
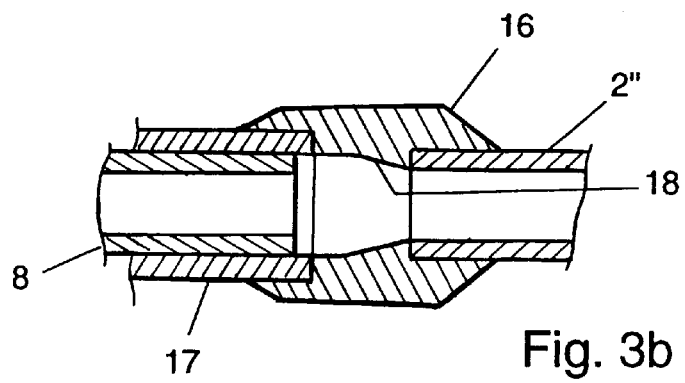

FIG. 3*a* shows how according to the principle of the invention a branch can be made when the branch tube 2 has a diameter so slight that no guide tube can be slid into it. Such a branch tube may be desirable with a view to saving cost, because the branch tubes are rather costly owing to the necessity of providing an armour. A smaller diameter results in a saving of cost. FIG. 3*a* shows such a branch tube 2 with an armour 2' and an inner tube 2". When making a branch, the steps described with reference to FIGS. 1 and 2 are traversed, but instead of introducing a guide tube 9 into the branch tube 2, an inner tube 2" of the tube 2, stripped of armour 2', is connected via a connecting element 16 with a tubular guide sleeve 17 which has a length of a few tens of centimeters to a few meters. The interrupted end of a guide tube 8 is fed into this guide sleeve 17 as far as the connecting element 16. All this is shown in detail in FIG. 3*b*. The connecting element 16 preferably has a slightly inclined guide surface 18 to ensure the proper guidance of a cable into the tube 2" under all circumstances. To prevent the guide sleeve 17 of the guide tube 8 from being blown away when using a blowing technique during installation, the connecting element may further be provided with a bleed hole 19 for discharging the air from the connecting element. Obviously, the solution according to FIG. 3 can also be used with armoured tubes 2 with a greater internal tube diameter, where the inner tube itself can form the guide sleeve and no connecting element 16 is necessary.

Figure 4:
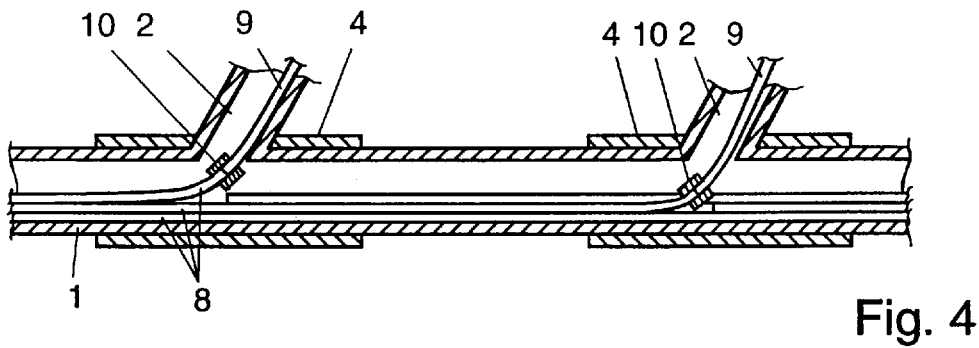
FIG. 4 is a schematic view of the course of a bundle of guide tubes with branches.
Figure 5:
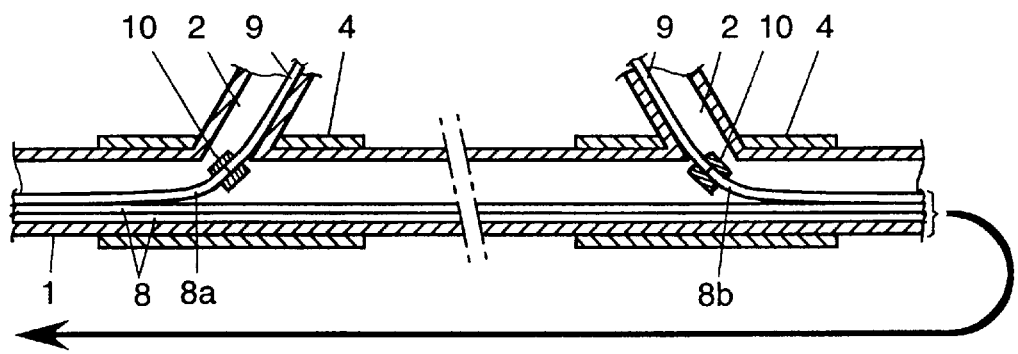
FIG. 5 is an example of a use where the installed bundle of guide tubes is optimally utilized.

FIG. 4, for the sake of clarity, schematically shows two successive branches 2 of a tube 1, with a bundle consisting throughout of the same number of guide tubes having been routed along the entire length of the tube 1. Because in the method according to the invention the portion of a guide tube 8 "downstream" of a branch remains unused, as shown in FIG. 5, that portion 8*b* can also be used, for instance via an "inverted" Y-shaped branch element 4, to provide a fiber optic cable therein and to lead it to the terminal to which the branch 2 with the guide tube 8*a* has been led. It is also possible to use, instead of a Y-piece, a T-piece which is suitable for directing both guide tube portions 8*a* and 8*b* to a branch tube 2. Optionally, the transitions between the leg and the cross-pieces of the T can be rounded off for a uniform guidance of the guide tubes. Now, if the tube structure 1 is annular, in case of failure in a part of the ring as a result of which the cable in the tube 8*a* has become useless, the terminal can remain accessible via the cable in the tube 8*b*.

Figure 6:
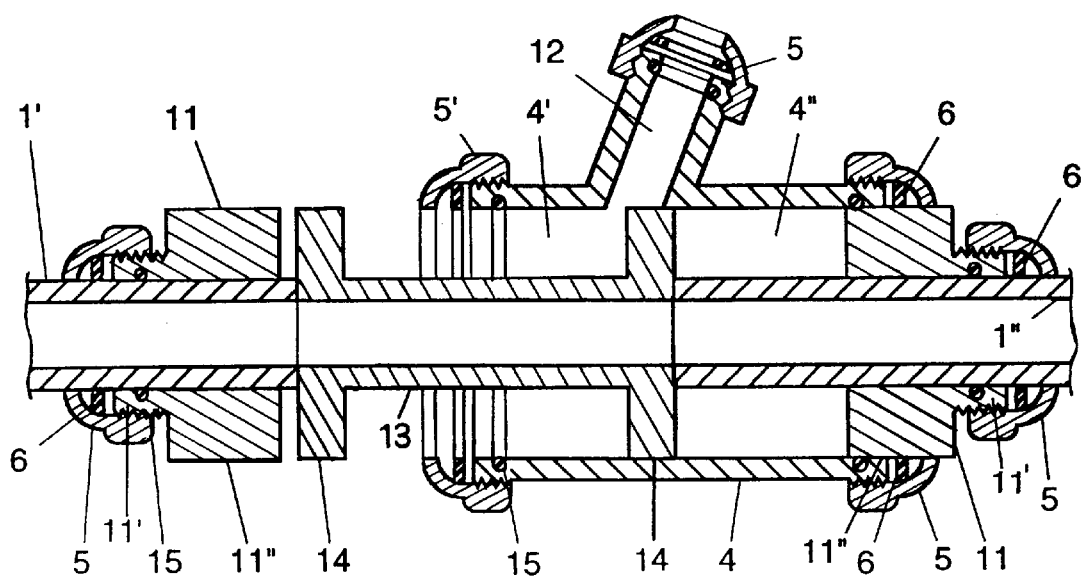
FIG. 6 shows a second embodiment of a branch element according to the invention.

If adjacent a branch more space is needed for making the branch connections of the guide tubes, for instance because several tubes are branched off at one branch, because the tube 1 has a slight internal diameter or because the coupling sleeve 10 occupies much space, use can be made of a branch element as shown in FIG. 6, having a greater passage from the inlet side to the outlet side. For restoring the integrity of tube 1 after its being cut, use is made of an adapted insert element 13 with collars 14 and, on opposite sides of the branch element, of a double pair of union nuts 5 and 5' for the purpose of clamping the branch element airtightly on the tube 1 via an adapter piece 11. To make it possible, also when using such an adapted insert element 13, to slide the branch element over the tube 1 when setting the insert element 13 and when forming a branch in the guide tube 8, the adapter piece 11 is annular, with a first portion 11' having a screw thread on the outer circumference thereof, which screw thread is engageable by a union nut 5 for clamping the adapter piece on the tube 1, and with a second, adjacent portion 11", whose diameter is substantially equal to that of the inlet or outlet opening 4', 4". The inlet or outlet opening 4', 4" can then be clamped securely on the external circumference of the portion 11" of the adapter piece 11. An insert element 13 and an adapter piece 11 can be used not only for creating additional interior space but also for the purpose of using a branch element having inlet and outlet openings of a particular diameter for branches of tubes 1 with an external diameter that is less than that particular diameter.

A branch element, instead of being a one-piece Y-shaped or differently shaped branch element, can also consist of two dishes. This provides the advantage that once a bundle of tubes has been installed in the tube 1, a branch element can be fitted in the second instance at any desired point by removing a length from the tube 1 and then making the branch and clamping the dishes of the coupling element airtightly around the tube 1.

However, also in the case of a one-piece branch element, it is possible to afterwards provide the branch element in a tube with a bundle of guide tubes therein. To that end, simultaneously with or after the removal of a portion of the outer tube, the entire bundle of tubes is cut through, the Y- or T-shaped branch element 4 is slipped onto an end and the desired branch is made, if necessary by means of a coupling sleeve and a guide tube connected thereto. The other cut guide tubes are joined together again by means of coupling sleeves 10.

I claim:

1. A method for installing a ducting system with branches, wherein at a point where a branch is desired, a tubular branch element with an inlet opening, an outlet opening and at least one branch opening is arranged between two opposite free ends of a duct having an interruption formed therein between the two opposite free ends thereof, wherein a distance between the two opposite free ends of the duct is less than a distance between the inlet opening and the outlet opening of the branch element, and wherein the inlet opening and the outlet opening of the branch element and at least a part of a passage therebetween have a greater cross-sectional dimension than a cross-sectional dimension of the duct, said method comprising:

sliding the branch element onto one of the two opposite free ends of the duct;

placing a filler element between the two opposite free ends of the duct in a form divisible in a longitudinal direction of the duct, said filler element having substantially a same internal diameter and substantially a same length as the interruption formed in the duct; and moving and securing the branch element such that the inlet opening of the branch element is sealingly engaged over one of the two opposite free ends of the duct adjacent to the interruption, and such that the outlet opening of the branch element is sealingly engaged over the other one of the two opposite free ends of the duct adjacent to the interruption.

2. A method according to claim 1, wherein the interruption in the duct is formed by removing a duct portion therefrom which has a lesser length than the distance between the inlet opening and the outlet opening of the branch element, and wherein the filler element comprises the removed duct portion divided in a lengthwise direction.

3. A method according to claim 1, wherein the inlet opening and the outlet opening of the branch element are sealingly engaged over the respective ones of the two opposite free ends of the duct in an airtight manner, and wherein the branch opening is also closed substantially airtightly.

4. A method according to claim 2, wherein the inlet opening and the outlet opening of the branch element are sealingly engaged over the respective ones of the two opposite free ends of the duct in an airtight manner, and wherein the branch opening is also closed substantially airtightly.

5. A method according to claim 1, wherein a bundle of guide tubes is installed in the duct and a desired one of the guide tubes is branched off by moving the branch element on the duct, removing the filler element, cutting the desired guide tube at the branch, leading a first free end of the cut desired guide tube to or into the branch opening, and subsequently re-securing the branch element such that the opening and the outlet opening of the branch element are sealingly engaged over the respective ones of the two opposite free ends of the duct.

6. A method according to claim 4, wherein a bundle of guide tubes is installed in the duct and a desired one of the guide tubes is branched off by moving the branch element on the duct, removing the filler element, cutting the desired guide tube at the branch, leading a first free end of the cut desired guide tube to or into the branch opening, and subsequently re-securing the branch element such that the inlet opening and the outlet opening of the branch element are sealingly engaged over the respective ones of the two opposite free ends of the duct.

7. A method according to claim 5, wherein a further guide tube is coupled to the first free end of the cut desired guide tube using a coupling element which provides an airtight connection between the further guide tube and the first free end of the cut desired guide tube, and wherein the coupled guide tube is led via the branch opening out of the branch element.

8. A method according to claim 6, wherein a further guide tube is coupled to the first free end of the cut desired guide tube using a coupling element which provides an airtight connection between the further guide tube and the first free end of the cut desired guide tube, and wherein the coupled guide tube is led via the branch opening out of the branch element.

9. A method according to claim 5, wherein a second free end of the cut desired guide tube is branched off via the same branch opening as the first free end of the cut desired guide tube or via a branch opening of a next branch element.

10. A method according to claim 6, wherein a second free end of the cut desired guide tube is branched off via the same branch opening as the first free end of the cut desired guide tube or via a branch opening of a next branch element.

11. A method according to claim 7, wherein a second free end of the cut desired guide tube is branched off via the same branch opening as the first free end of the cut desired guide tube or via a branch opening of a next branch element.

12. A method according to claim 8, wherein a second free end of the cut desired guide tube is branched off via the same branch opening as the first free end of the cut desired guide tube or via a branch opening of a next branch element.

13. A method according to claim 5, wherein a guide sleeve is slid a predetermined distance over one of the first free end the cut desired guide tube and a second free end of the cut desired guide tube into the duct, said guide sleeve having a diameter which is greater than a diameter of the cut desired guide tube.

14. A method according to claim 6, wherein a guide sleeve is slid a predetermined distance over one of the first free end the cut desired guide tube and a second free end of the cut desired guide tube into the duct, said guide sleeve having a diameter which is greater than a diameter of the cut desired guide tube.

15. A method according to claim 13, wherein a branch tube is coupled to the branch opening of the branch element, said branch tube having an armored jacket and an inner tube having a diameter substantially equal to the diameter of the cut desired guide tube, and wherein the guide sleeve is coupled to the inner tube of the branch tube.

16. A method according to claim 14, wherein a branch tube is coupled to the branch opening of the branch element, said branch tube having an armored jacket and an inner tube having a diameter substantially equal to the diameter of the cut desired guide tube, and wherein the guide sleeve is coupled to the inner tube of the branch tube.

* * * * *